(12) United States Patent
Ehmann

(10) Patent No.: US 6,701,390 B2
(45) Date of Patent: Mar. 2, 2004

(54) FIFO BUFFER THAT CAN READ AND/OR WRITE MULTIPLE AND/OR SELECTABLE NUMBER OF DATA WORDS PER BUS CYCLE

(75) Inventor: Gregory E. Ehmann, Sleepy Hollow, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 328 days.

(21) Appl. No.: 09/875,376

(22) Filed: Jun. 6, 2001

(65) Prior Publication Data

US 2002/0188767 A1 Dec. 12, 2002

(51) Int. Cl.$^7$ ............................................. G06F 13/00
(52) U.S. Cl. ............................. 710/33; 710/29; 710/52; 710/61; 711/149; 709/212
(58) Field of Search .................. 710/52–57, 20–35, 710/60–61, 305–307; 711/113–114, 149–151; 365/233, 230, 219; 714/718; 713/416; 709/212–213

(56) References Cited

U.S. PATENT DOCUMENTS

| | | | | |
|---|---|---|---|---|
| 4,138,732 A | * | 2/1979 | Suzuki et al. ................. 710/31 |
| 4,590,551 A | * | 5/1986 | Mathews ..................... 711/150 |
| 4,604,683 A | * | 8/1986 | Russ et al. ................... 710/100 |
| 4,692,893 A | * | 9/1987 | Casper ......................... 710/55 |
| 4,825,357 A | * | 4/1989 | Ovies et al. ................... 710/29 |
| 4,930,069 A | * | 5/1990 | Batra et al. ................. 709/212 |
| 5,121,480 A | | 6/1992 | Bonke et al. |
| 5,261,059 A | * | 11/1993 | Hedberg et al. ............ 710/317 |
| 5,337,414 A | * | 8/1994 | Hashemi et al. .............. 710/52 |
| 5,396,596 A | * | 3/1995 | Hashemi et al. ............ 711/113 |
| 5,490,263 A | * | 2/1996 | Hashemi ..................... 711/149 |
| 6,401,149 B1 | * | 6/2002 | Dennin et al. ................ 710/58 |
| 6,523,088 B2 | * | 2/2003 | Fujimoto et al. ........... 711/114 |

\* cited by examiner

*Primary Examiner*—Christopher B. Shin
(74) *Attorney, Agent, or Firm*—Peter Zawilski

(57) ABSTRACT

A first in, first out (FIFO) circular buffer enables high speed streaming data transfer between integrated circuit devices by performing more than one data element transfer unidirectionally by having a plurality of ports to address a memory array. In addition, the multiple transfers are performed during one bus cycle and the number of transfers may be selectable. FIFO control circuitry limits the number of data elements transferred in response to the state of the memory array including almost empty or almost full.

12 Claims, 3 Drawing Sheets

FIFO BUFFER THAT CAN READ AND/OR WRITE MULTIPLE AND/OR SELECTABLE NUMBER OF DATA WORDS PER BUS CYCLE

FIELD OF THE INVENTION

The present invention relates to a digital data buffer, and in particular, to a First In First Out (FIFO) buffer, e.g., for use in synchronizing data communication across an integrated circuit to integrated circuit interconnection.

BACKGROUND OF THE INVENTION

Semiconductor manufacturing technology continues to yield increasing density and speed of Integrated Circuit (IC) devices. The staggering capability of millions of logic gates per square centimeter of silicon enables mass integration, such as fabricating complete Systems on a Chip (SOC). Unfortunately, often the capability for designing highly integrated systems lags behind the manufacturing capability. The increased complexity compounds the risk associated with debugging and verifying the interfaces between blocks of gates that form the SOC and between IC's.

One approach to shortening the design cycle time of highly integrated devices is Rapid Silicon Prototyping (RSP), wherein hardware and software are concurrently designed for a custom Application Specific Integrated Circuit (ASIC) or an integrated plurality of ASIC'S. RSP combines methodologies of design reuse, on-chip bus architectures and system integration to substantially improve the ability of designers to create advanced custom ASIC's and associated system software content faster and with a high probability of success. RSP is based on the premise that it is easier to design a system by "deconfiguring", i.e., removing blocks from, and "extending", i.e., adding blocks to, an existing and proven reference design made from reusable components.

Standardized busses allow deconfiguring and extending the reference design by enforcing a standardized interface upon the reusable components. Thus, standardized busses provide many benefits such as reduced risk, improved productivity and reduced time to market associated with RSP. One type of standardized bus often required in a system designed using RSP is for high-bandwidth streaming data, hereinafter referred to as a "tunnel".

Interconnecting different IC's with a tunnel is complicated by differences between the transmitting IC device and the receiving IC device. For example, the two IC's may be fabricated using differing fabrication techniques wherein the transmitting IC device is a peripheral device operating at 200 MHz whereas the receiving IC device is a processing device operating at 400 MHz. As another example, due to manufacturing variances, one IC may operate at a slightly different speed than the other. As a further example, due to the software design, one IC design may operate on the streaming data at varying intervals. Thus, for these and other reasons, the tunnel may become a limitation on the throughput of high-bandwidth streaming data due to synchronization problems and limitations on transmission of data per bus cycle.

Synchronization of data in a chip-to-chip interconnection is conventionally provided by a First In First Out (FIFO) circular buffer, also referred to herein as FIFO, in both the transmitting IC device and the receiving IC device. The transmitting FIFO buffers data elements prior to transmission. The receiving FIFO buffers data elements received from transmission. Conventional FIFO circular buffers include a read port and a write port that access a memory array. A write pointer points to an open data slot next to the most recently written to data slot. A read pointer points to the data slot containing the oldest data element stored in the data buffer, next to the data slot last read from the buffer. During each bus cycle to the FIFO, the read port uses the read pointer to successively address the next memory location after each read from the memory array and the write port uses the write pointer to successively address the next memory location after each write to the memory array. Control circuitry is provided to prevent writing to a full FIFO and to prevent reading from an empty FIFO.

Since the FIFO is limited to read and/or to write one data element per bus cycle, the tunnel is often effectively limited to the clock rate of the slower of the two IC devices. For example, a slow transmitting IC device would fill its transmitting FIFO buffer at a corresponding slow rate. A faster receiving IC device with a faster receiving FIFO buffer would tend to empty its buffer more quickly, and essentially be forced to wait for new data to be communicated and placed in its buffer. Thus, the tunnel is band limited to the rate at which the transmitting FIFO is capable of sequencing out its stored data. Alternatively, a fast transmitting IC device would fill its transmitting FIFO buffer faster than a slower receiving IC device and its receiving FIFO buffer could handle it. Thus both buffers would tend to be filled, limited by the rate at which the receiving FIFO buffer could sequence out the received data.

Speeding up a slower IC device in order to have a faster FIFO is often impractical, due to the increased manufacturing costs. Alternatively, adding an additional channel to the tunnel to increase the bandwidth of *n streaming data may be impractical due to limitations on the available number of conductors between IC's and/or the additional complexity and delay in separating and recombining data transmitted through the separate channels.

Therefore, a need exists for a manner of maximizing the bandwidth of a tunnel coupled to IC's of differing communication abilities, (e.g., due to differing clock speeds). In particular, a significant need exists for a FIFO buffer that can increase the bandwidth of data elements transferred and thus can assist in harmonizing independent IC's coupled over a tunnel.

SUMMARY OF THE INVENTION

The present invention addresses these and other problems in the prior art by providing a First In First Out (FIFO) buffer capable of unidirectionally transmitting multiple data elements per bus cycle, thereby increasing the amount of data transmitted without increasing bus speed. In addition, a FIFO buffer may also be provided that permits a selectable number of data elements to be unidirectionally transmitted within a given bus cycle, such that the effective bandwidth of the FIFO buffer can be dynamically controlled.

Consistent with one particular aspect of the invention, a FIFO buffer includes a memory array having a plurality of data slots with each data slot storing a data element. FIFO control circuitry responds to a data command by performing either a single data element transfer or a double data element transfer with the memory array.

Consistent with another aspect of the invention a FIFO buffer is used in a communication link between transmitting and receiving devices. The FIFO includes a pair of write ports and a pair of read ports that access data elements from a memory array. FIFO control circuitry is responsive to a write data command to perform either a single or double data element write via the write ports to the memory array. The FIFO control circuitry is also responsive to a read data command to perform either a single or double data element read via the read ports from the memory array.

Consistent with yet a further aspect of the invention, a communication link between transmitting and receiving devices includes a transmission FIFO buffer that transmits data elements to a receiving FIFO buffer across a transmission channel. Each FIFO buffer includes FIFO control circuitry to perform either a single or double data element read in response to a read data command and to perform either a single or double element write in response to a write data command.

Consistent with yet a further aspect of the invention, a method of communicating data elements between transmitting and receiving devices includes responding to a write data command by performing either a single or double data element write and responding to a read data command by performing either a single or double data element read.

Consistent with an additional aspect of the invention, a FIFO buffer includes a plurality of ports for accessing data slots of a memory array and FIFO control circuitry that responds to a data command to unidirectionally access a plurality of data slots via the plurality of ports.

The above and other objects and advantages of the present invention shall be made apparent from the accompanying drawings and the description thereof.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

A First In, First Out (FIFO) circular buffer includes additional ports to the write and read sides of a memory array in order to allow multiple data elements, such as digital packets or digital words, to be transferred from the FIFO simultaneously. Thus, multiple data elements may be transferred during a single bus cycle, rather than sequentially over multiple bus cycles, thereby providing faster FIFO operation without the expense of a faster clock cycle. Moreover, in some embodiments the number of data elements that are transferred during a bus cycle can be selectable between different possible values, thereby providing greater control over the effective bandwidth of a FIFO. In addition, applications of the FIFO circular buffer in a data bus between Integrated Circuits (IC) flexibly perform one or more data reads and/or data writes, simplifying synchronization control between IC's.

Figure 1:
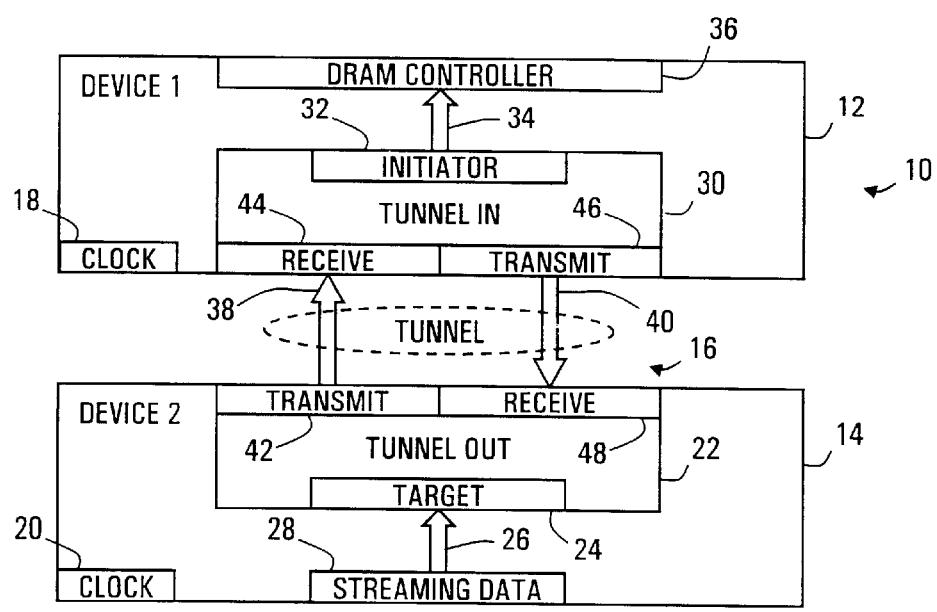
FIG. 1 is a diagram of a data bus, or tunnel, between two devices forming an integrated device.

Turning to the Drawings, wherein like numbers denote like parts throughout the several views, FIG. 1 depicts an integrated system 10 formed by a first IC (receiving) device 12 and a second IC (transmitting) device 14 that communicates across a communication link, depicted as tunnel 16. Although devices 12, 14 may reside on the same semiconductor die, in the illustrative embodiment, each device 12, 14 is a separate integrated circuit driven by respective clocks 18, 20. For instance, each device, 12, 14 may respectively be a processor chip and a peripheral chip developed concurrently, for a Rapid Silicon Prototyping (RSP) environment. The tunnel 16 advantageously provides chip-to-chip interconnection for high bandwidth data streaming, enabling a high degree of integration between devices 12, 14.

In particular, the tunnel 16 includes a tunnel out circuit 22 that resides in the transmitting device 14. The tunnel out circuit 22 has a target 24 that interfaces to an internal IC bus 26 for receiving from a streaming data device 28. The tunnel 16 also includes a tunnel in circuit 30 that resides on transmitting device 12. The tunnel in circuit 30 includes an initiator 32 that resides on an internal IC bus 34 of the receiving device 12 for providing the streaming data to components on the receiving device 12, depicted as DRAM controller 36.

The tunnel 16 enables the streaming data device 28 on the internal IC bus 26 of the transmitting device 14 to appear to be resident on receiving device 12, communicating with internal IC bus 34. Therefore, RSP is enhanced for developing receiving device 12 and transmitting device 14 since synchronization of clocks 18, 20 and other timing considerations are not critical for proper communication within integrated system 10.

Tunnel 16 also includes both a forward communication path 38 and a return communication path 40. In particular, the tunnel out circuit 22 includes a transmit circuit 42 that forwards data across the forward communication path 38 to a receive circuit 44 of the tunnel in circuit 30. Similarly, the tunnel in circuit 30 includes a transmit circuit 46 that communicates data across the return communication path 40 to a receive circuit 48 of the tunnel out circuit 22.

It will be appreciated by those skilled in the art having the benefit of the present disclosure that the depiction of integrated system 10 is illustrative and that a tunnel 16 consistent with aspects of the invention may reside within a single device 12, 14, and perform as an internal IC bus. In addition, the tunnel 16 may be unidirectional with only a forward communication path 38 or a return communication path 40. In addition, applications consistent with aspects of the invention may perform other forms of digital communication. The invention is therefore not limited to the particular RSP application discussed herein. Rather, the herein-described FIFO buffers may be used in practically any buffering application in which conventional FIFO buffers are used.

Figure 2:
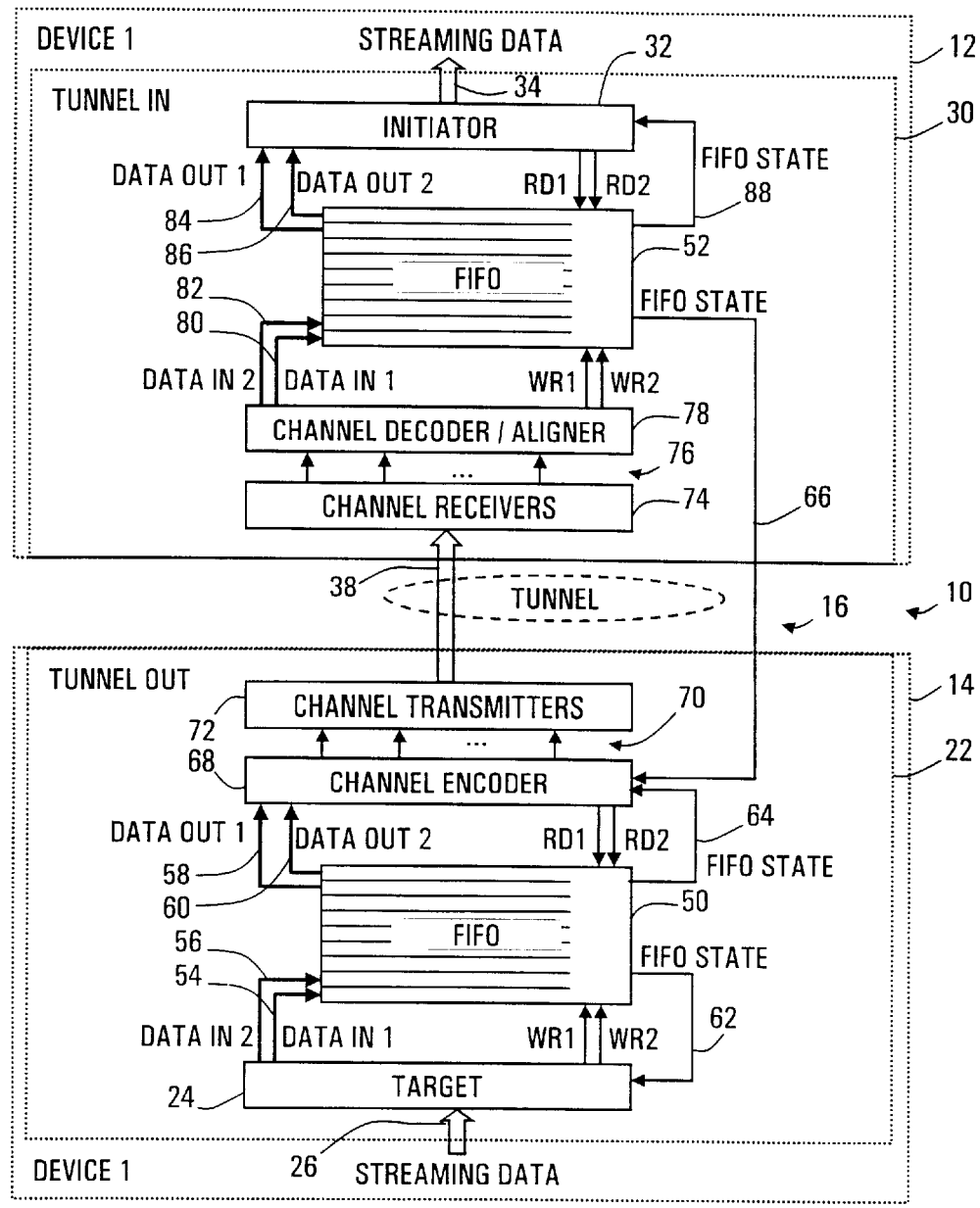
FIG. 2 is a diagram of the tunnel of the integrated device of FIG. 1 wherein each device includes a FIFO circular buffer consistent with aspects of the present invention.

Referring to FIG. 2, a portion of the tunnel 16 for forward data communication from transmitting device 14 to receiving device 12 advantageously includes a transmitting EJIFO buffer 50 in the tunnel out circuit 22 and a receiving FIFO buffer 52 in the tunnel in circuit 30 for buffering data during transmission and reception respectively. Streaming data received by the target 24 of the tunnel out circuit 22 is written to the transmitting FIFO buffer 50 based on the state of the transmitting FIFO buffer 50, that is, depending on whether the transmitting FIFO buffer 50 has space available for additional data. The tunnel out circuit 22 is also responsive to the state of the receiving FIFO buffer 52 in the tunnel in circuit 30 for transmitting data across the forward tunnel channel 38. The tunnel out circuit 22 limits transmission data to the rate that the receiving FIIFO buffer 52 can accept data. Then, the initiator 32 in the tunnel in circuit 30 is responsive to the state of the receiving FIFO buffer 52 for reading out data in the receiving FIIFO buffer 52.

In particular, the tunnel 16 selectably buffers and transmits a number of data words per bus cycle to enhance synchronization between devices 12, 14. Streaming data received across the internal IC bus 26 by the target 24 is written to the transmitting FIFO buffer 50 depending upon the state of the transmitting FIFO buffer 50. In the illustrative depiction, the transmitting FIFO buffer 50 includes two write ports 54, 56 and two read ports 58, 60. The target 24 senses the state of the transmitting FIFO buffer 50 across line 62. If the state is FULL, then no write is commanded by the target during this bus cycle. If the state on line 62 is almost full (e.g., "FULL–1"), then the target 24 commands a write one data element ("WR1 ") to the transmitting FIFO buffer 50 and provides the one data element to write port 54 ("DATA IN 1"). The transmitting FIFO buffer 50 addresses the first write port 54 to the next available data slot in response to the data command. If the state on line 62 is not full or almost full, then the target 24 commands a write two data elements ("WR2") to the transmitting FIFO buffer 50 and provides the first data element as before and additionally provides the second data element to the second write port 56 ("DATA IN 2"). The transmitting FIFO buffer 50 addresses the first write port 54 as before and additionally routes the second write port 56 to the next available data slot adjacent to the slot addressed by the first write port 54. It will be appreciated that the target 24 will command no write if no streaming data has been received from the internal IC bus 26 or will command a write one data element if just one data element has been received, even if the transmitting FIFO buffer 50 can handle additional data elements.

A portion of the tunnel out circuit 22 that is downstream of the transmitting FIFO buffer 50 is responsive to both the state of the transmitting FIFO buffer 50, received on line 64, as well as the state of the receiving FIFO buffer 52, received on line 66. In particular, the downstream portion includes a channel encoder 68 that performs no read from the transmitting FIFO buffer 50 when either the sensed state of the transmitting FIFO buffer 50 is empty or the sensed state of the receiving FIFO buffer 52 is full. The channel encoder 68 commands read one data element ("RD 1") from the write port 58 of the transmitting FIFO buffer 50 when either the state of the receiving FIFO buffer 52 is almost full or the transmitting FIFO buffer 50 is almost empty. In response to the "RD 1" command, the transmitting FIFO buffer 50 couples the write port 58 to the oldest data address to write out "DATA OUT 1". The channel encoder 68 encodes the "DATA OUT 1" data element, forwards on one or more internal transmission channels 70 to channel transmitters 72 that transmit the encoded and channelized data elements across forward tunnel channel 38 to the tunnel in circuit 30.

Alternatively, the channel encoder 68 commands a read two elements ("RD2") in response to the sensed state of the receiving FIFO buffer 52 to not be full nor almost full and the sensed state of the transmitting FIFO buffer 50 to not be empty or almost empty. In addition to the actions described above for a data command for read one data element (RD1), in response to the RD2 command, the transmitting FIFO buffer 50 outputs the next oldest data element ("DATA OUT 2") to the channel encoder 68, which is similarly encoded, channelized and transmitted to the receiving IC device 12.

The tunnel in circuit 30 includes channel receivers 74 that receive the encoded channelized data from the forward tunnel channel 38. The received data is forwarded over one or more internal receiving channels 76 to a channel decoder/aligner 78. Depending on the amount of data received, the channel decoder/aligner 78 commands no data transfer, a write one data element ("WR1"), or a write two data elements ("WR2") to the receiving FIFO buffer 52. The channel decoder/aligner 78 makes the one or two data elements available as "DATA IN 1" and "DATA IN 2" respectively to write ports 80, 82 of the receiving FIFO buffer 52. The receiving FIFO buffer 52 writes these data elements to the next available write data slots.

Although not depicted, it will be appreciated by those skilled in the art having the benefit of the present invention that the channel decoder/aligner 78 may further be responsive to the state of the receiving FIFO buffer 52 to selectively command a smaller data transfer than the amount of data received. For instance, the channel decoder/aligner 78 may include inherent storage capability that can be further used to take advantage of the selectable number of data words that may be transferred to the receiving FIFO buffer 52.

The receiving FIFO buffer 52 makes the oldest two data elements available at read ports 84, 86 for the initiator 32 to read, as commanded by the initiator 32. The initiator 32 is responsive to the state of the receiving FIFO buffer 52, sensed on line 88, to command read one data element ("RD1") when the receiving FIFO buffer 52 is almost empty. The initiator 32 is further responsive to the state of the receiving buffer 52 to command read two data elements ("RD2") when the receiving FIFO buffer 52 is not empty nor almost empty.

It will be appreciated that transmitting FIFO buffer 50 may be implemented to be triggered by a single clock wherein data in and data out occurs in response to the same clock signal. By contrast, the receiving FIFO buffer 52 may advantageously respond to two clock signals to further enhance synchronization within the integrated device 10. In particular, data received from channel decoder/aligner 70 may be responsive to a clock signal inherent in received data across forward communication path 38. Consequently data writes to FIFO 52 may be synchronized to this received clock signal; data read by initiator 32 may be synchronized to the clock 18 signal of receiving device 12.

Figure 3:
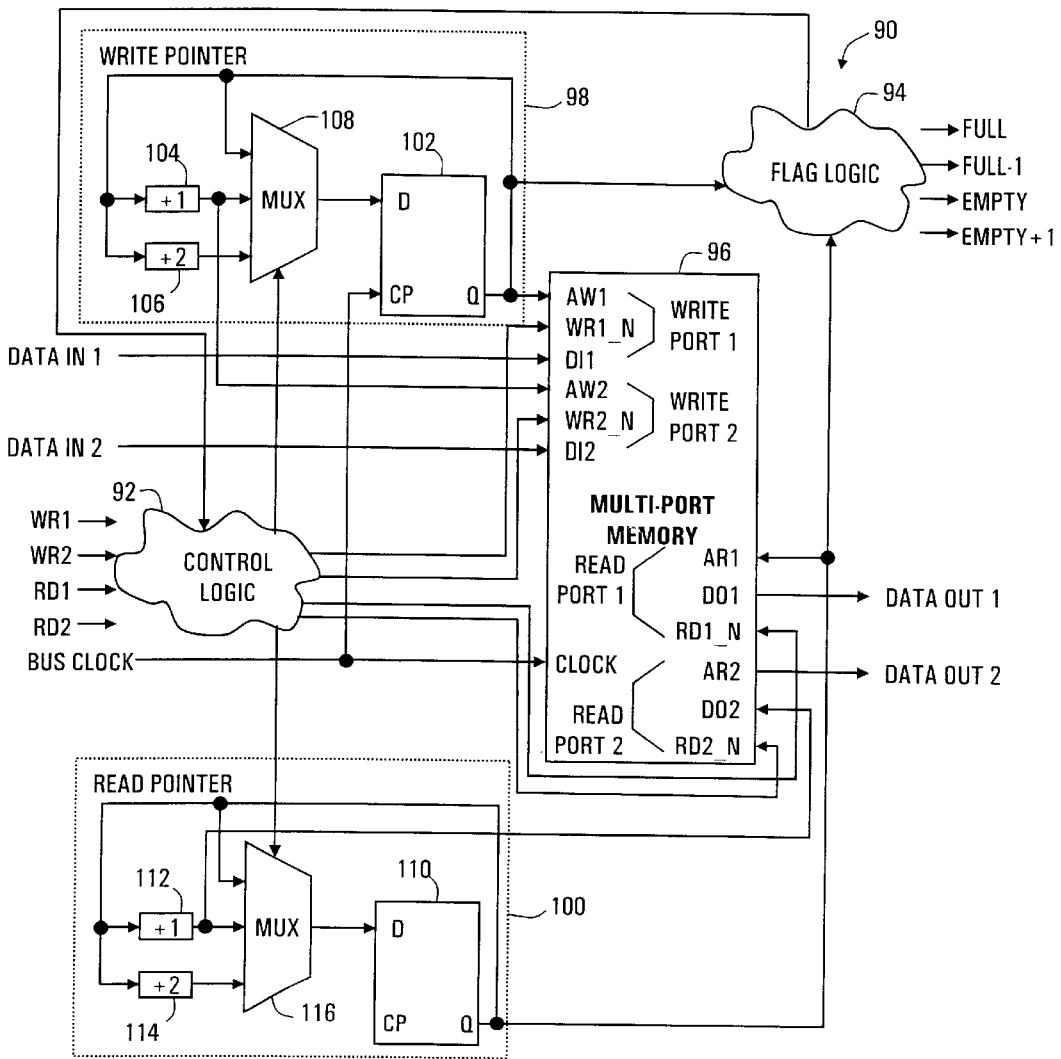
FIG. 3 is a diagram of a FIFO circular buffer of FIG. 2.

With reference to FIG. 3, a FIFO circular buffer operates by having sequentially referencing data addresses for data slots to write data to a memory array, wrapping around to the beginning of the array when the end is reached. Similarly, the data stored in the memory is sequentially read out, with the data slot with the oldest data addressed first. A write pointer keeps track of the next available data slot for writing a data element and a read pointer keeps track of the data slot with the oldest data. Provisions are included to prevent the read pointer from overtaking the write pointer.

In particular, a FIFO buffer 90 illustrates multiple data element transfers by having a plurality of write ports depicted as WRITE PORT 1 and WRITE PORT 2, as well as a plurality of read ports depicted as READ PORT 1 and READ PORT 2. The FIFO buffer 90 includes control circuitry that responds to data commands to perform single or double data element transfers. In particular, the FIFO control circuitry is depicted as a control logic 92 for receiving data commands, flag logic 94 to sense the amount of data stored in a memory array 96 and write pointer circuitry 98 and read pointer circuitry 100 for addressing the plurality of ports.

The control logic 92 receives a command to write one data element ("WR1") or to write two data elements ("WR2"). The control logic 92 is responsive to the sensed state of the memory 96 provided by the flag logic 94 to selectively command a write data transfer. Specifically, first, the control logic 92 does not enable a write data transfer if the state of the memory array 96 is full or if no WR1 or WR2 signal is received. Second, the control logic 92 enables the WRITE PORT 1 with write enable signal 1 ("WR1_N") if write one data element signal WR1 is received or if write two data elements signal WR2 is received and the memory array 96 is almost full. Third, the control logic 92, in addition to enabling WRITE PORT 1, enables WRITE PORT 2 with write enable signal 2 ("WR2_N") when a write two data elements signal WR2 is received and the memory array 96 is neither full nor almost full.

When enabled, WRITE PORT 1 reads the "DATA IN 1" signal at data input I ("DI1") and writes it to the data slot specified by the write address 1 ("AW1"). When enabled, the WRITE PORT 2 reads the "DATA IN 2" signal at data input 2 ("DI2") and writes it to the data slot specified by the write address 2 ("AW2"). The two write addresses AW1, AW2 are provided by the write pointer circuitry 98.

Write pointer circuitry 98 addresses data slots (not shown in FIG. 3) in the memory array 96 so that the memory array 96 may be used as a circular buffer. In particular, write pointer circuitry 98 includes a D flip flop 102 having output "Q" that points to the next available slot at input "AW1", used to unidirectionally write data to memory array 96. The next available write address AW1 is also fed back to a +1 adder 104, a +2 adder 106 and to 3-to-1 MUX 108. The incremented outputs of the adders 104, 106 are coupled to the other two inputs of the MUX 108. The incremented output of the +1 adder 104 is also provided to an input "AW2" to address the next-next address for the WRITE PORT 2. The MUX 108 is controlled by the control logic 92 to update the addresses AW1 and AW2. In particular, after a write transfer of one data element, the MUX 108 is commanded to output an incremented value from the +1 adder 104 that resets input "D" of the D flip flop 102 to the next available address. After a write transfer of two data elements, the MUX 108 is commanded to output a twice incremented value from the +2 adder 106 to the D flip flop 102.

The control logic 92 also receives a command to read one data element ("RD1") or to read two data elements ("RD2"). The control logic 92 is responsive to the sensed state of the memory 96 provided by the flag logic 94 to selectively command a read data transfer. Specifically, first, the control logic 92 does not enable a read data transfer if the state of the memory array 96 is empty or if no RD 1 or RD2 signal is received. Second, the control logic 92 enables the READ PORT 1 with read enable signal 1 ("RD1_N") if read one data element signal RD1 is received or if read two data elements signal RD2 is received and the memory array 96 is almost empty. Third, the control logic 92, in addition to enabling READ PORT 1, enables READ PORT 2 with read enable signal 2 ("RD2_N") when a read two data elements signal RD2 is received and the memory array 96 is neither empty nor almost empty.

When enabled, READ PORT 1 outputs the "DATA OUT 1" signal at data output 1 ("DO1") by reading from the data slot specified by the read address 1 ("AR1"). When enabled, the READ PORT 2 outputs the "DATA OUT 2" signal at data output 2 ("DO2") by reading from the data slot specified by the read address 2 ("AR2"). The two read addresses AR1, AR2 are provided by the read pointer circuitry 100.

The read pointer circuitry 100 includes a D flip flop 110 that has an output "Q" that provides the memory address for a data slot containing the oldest data to the "AR1" input of the READ PORT 1 of the memory array 96. The oldest data address AR1 is also fed back to a +1 adder 112, a +2 adder 114 and to a 3-to-1 MUX 116. The incremented outputs of the adders 112, 114 are coupled to the other two inputs of the MUX 116. The incremented output of the +1 adder 112 is also provided to an input "AR2" to address the next-oldest address for the READ PORT 2. The MUX 116 is controlled by the control logic 92 to update the addresses AR I and AR2. In particular, after a read transfer of one data element, the MUX 116 is commanded to output an incremented value from the +1 adder 112 that resets input "D" of the D flip flop 110 to the next available address. After a read transfer of two data elements, the MUX 116 is commanded to output a twice incremented value from the +2 adder 114 to the D flip flop 110.

Flag logic 94 receives the current write address AW1 from the D flip flop 102 and the current read address AR1 from the D flip flop 110, from which a determination may be made as to whether the memory array 96 is full (no slots open), almost full (only one slot open), empty (no slots filled) or almost empty (only one slot filled).

It will be appreciated that applications consistent with aspects of the present invention may include additional ports, such as three or more, and that two read ports and that two write ports are illustrative only. In addition, the number of read ports may differ from the number of write ports. Furthermore, the size of data elements written to and read from the memory array may differ such that write ports and read ports may perform data transfers of data elements of different sizes from one another.

The sequencing of reads and writes by the FIFO buffer 90 is controlled by a bus clock. Thus, on one timing point, one or more reads or writes are performed. On a subsequent timing point, the read and write pointers are incremented the appropriate number of slots to correspond to the data transfers. Advantageously, the bus clock may comprise double data rate transfer wherein transfers occur on both rising and falling edges of a clock pulse.

In use, a FIFO buffer 90 receives a bus clock transition. In response to a data command to write one or two data elements (WR1, WR2), the control logic 92 determines whether the state of the memory array 96 is sufficient to have enough available data slots, reducing the number of write ports (WRITE PORT 1 and 2) enabled (WR1_N, WR2_N) to correspond to the number of available data slots. Each enabled write port receives the input data (DATA IN 1, DATA IN 2) and writes it to the respective address (AW1, AW2) provided by the write pointer circuitry 98.

In response to a command to read one or two data elements (RD1, RD2), the control logic 92 determines whether the state of the memory array 96 is sufficient to have enough available data slots, reducing the number of read ports (READ PORT 1 and 2) enabled (RD1_N, RD2_N) to correspond to the number of available data slots. Each enabled read port outputs the output data (DATA OUT 1, DATA OUT 2) as read from the data slots referenced by the respective address (AR1, AR2) provided by the read pointer circuitry 100.

On a subsequent timing interval, the write and read pointer circuitry 98, 100 are updated to the next available data slots as appropriate in view of number of data elements written or read respectively. Also the flag logic 94 update the state of the memory array 96, in particular setting flags for states of full, almost full, empty or almost empty.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A data transfer apparatus, comprising:

a first data source circuit;

a first multi-port memory coupled to the first data source circuit;

a first control and status circuit coupled to the first multi-port memory, and further coupled to the first data source circuit;

a channel encoder coupled to the first multi-port memory, and further coupled to the first control and status circuit;

a channel transmitter coupled to the channel encoder;

a communication path coupled to the channel transmitter;

a channel receiver coupled to the communication path;

a channel decoder coupled to the channel receiver;

a second multi-port memory coupled to the channel decoder; and a second control and status circuit coupled to the second multi-port memory, and further coupled to the channel encoder;

wherein the first multi-port memory has a first plurality of read ports and a first plurality of write ports, and the second multi-port memory has a second plurality of read ports and a second plurality of write ports.

2. The data transfer apparatus of claim 1, wherein the first control and status circuit is adapted to receive a plurality of commands, and is further adapted to generate read control signals and write control signals for the first multi-port memory.

3. The data transfer apparatus of claim 2, wherein the first control and status circuit is adapted to control the selection of a read address for the first multi-port memory, and is further adapted to control the selection of a write address for the first multi-port memory.

4. The data transfer apparatus of claim 3, wherein the first control and status circuit is adapted to produce status information indicative of whether the state of the first multi-ported memory is full, almost full, empty, or almost empty.

5. The data transfer apparatus of claim 4, wherein the almost empty state occurs when there is only one unread data element left in the first multi-port memory.

6. The data transfer apparatus of claim 4, wherein the almost full state occurs when there is only one available data element storage location left in the first multi-port memory.

7. The data transfer apparatus of claim 4, wherein the first data source circuit; the first multi-port memory; the first control and status circuit; the channel encoder; the channel transmitter; the communication path; the channel receiver; the channel decoder; the second multi-port memory; and the second control and status circuit; are all integrated on a single chip.

8. A method of transferring data between a first and a second logical block of a single integrated circuit, wherein the first and second logical blocks are adapted to operate at different frequencies, the method comprising:

a) receiving data at a data source circuit;

b) determining the largest number of data elements that can be transferred in parallel from the data source circuit to a first multi-port memory;

c) transferring, if the largest number determined in (b) is greater than zero, that number of data elements in parallel to the first multi-port memory;

d) determining the largest number of data elements that can be transferred to a second multi-port memory, which has been configured as a circular FIFO buffer; and e) transferring, if the largest number determined in (d) is greater than zero, that number of data elements to the second multi-port memory.

9. The method of claim 8, wherein determining the largest number of data elements that can be transferred in parallel from the data source circuit to the first multi-port memory comprises determining whether there is sufficient space in the first multi-port memory, which has been configured as a circular FIFO buffer, to transfer at least two data elements of the received data to the first multi-port memory in parallel.

10. The method of claim 8, further comprising receiving a command to write at least two data elements to the first multi-port memory, which has been configured as a circular FIFO buffer, determining that the first multi-port memory has only one location available to receive a data element, and writing one of the at least two data elements to the first multi-port memory.

11. The method of claim 10, wherein transferring data elements to the second multi-port memory when the largest number is greater than one, comprises communicating the data elements in parallel from the first multi-port memory to a channel encoder, encoding the data elements in the channel encoder, communicating the encoded data elements to a channel transmitter, transmitting the encoded data elements through a communication path to a channel receiver, communicating the received encoded data elements to a channel decoder, decoding the encoded data elements and writing the encoded data elements to the second multi-port memory in parallel.

12. The method of claim 11, wherein the first multi-port memory, the channel encoder, the channel transmitter, the communication path, the channel receiver, the channel decoder, and the second multi-port memory are integrated onto a single integrated circuit.

* * * * *